United States Patent [19]

Hunt

[11] Patent Number: 5,325,481
[45] Date of Patent: Jun. 28, 1994

[54] METHOD FOR CREATING DYNAMIC USER PANELS IN AN ICONIC PROGRAMMING SYSTEM

[75] Inventor: William I. Hunt, Ft. Collins, Colo.
[73] Assignee: Hewlett-Packard Company, Palo Alto, Calif.
[21] Appl. No.: 685,236
[22] Filed: Apr. 12, 1991
[51] Int. Cl.⁵ .............................................. G06F 15/60
[52] U.S. Cl. ...................................... 395/159; 395/157
[58] Field of Search .............................. 395/155-161, 395/139, 133, 275, 650, 700, 375; 340/709-750, 721, 723, 700; 364/488-491, 474.24; 345/112-120, 127, 129, 130, 131

[56] References Cited

U.S. PATENT DOCUMENTS 4,901,221  2/1990  Kodosky et al. ................ 395/154
4,914,568  4/1990  Kodosky et al. ................ 395/159
5,008,853  4/1991  Bly et al. ........................ 395/157 X
5,025,395  6/1991  Nose et al. ...................... 395/157 X
5,040,142  8/1991  Mori et al. ...................... 395/157 X

OTHER PUBLICATIONS

Candill, "National Instruments Lab View 1.2", Computer Language, Sep. 1989, pp. 97 (2).
Mosley, "Lab View Upgrade Reduces Execution Time and Enhances Editing and Graphics Controls", EDN, Sep. 15, 1988, p. 134.
Strassberg, "Icon-Based Instrument-control softwawre works with PC Bus Data-Acquisition Boards", EDN, Jan. 4, 1990, p. 81.
Seifer, "Workbench MAC 3.0", MacWorld, May 1990, pp. 380, 382.
HyperCard User's Guide, Apple Corp., 1988, pp. 1-116, 185-195.
Programming With Pictures, Jeff Kodosky and Bob Dye, Computer Language Magazine, Jan. 1989, pp. 61-69.
Labview Product Description, National Instruments Corp., Austin, Tex. 1987.
An Instrument That Isn't Really, Michael Santori, IEEE Spectrum, Aug. 1990, pp. 36-39.
Labview: Laboratory Virtual Instrument Engineering Workbench, G. Vose and G. Williams, BYTE Magazine, Sep. 1986, pp. 84-92.

Primary Examiner—Mark K. Zimmerman
Assistant Examiner—John E. Breene

[57] ABSTRACT

A system that allows a programmer or user to dynamically create a user panel, including selecting the icons, for an iconic network program, or part of an iconic network program, within an iconic programming environment. The programmer or user may select a show-on-execute option for the panel which causes the panel to be displayed when any one of the icons within the panel is processed by the iconic programming system. The panel may also be secured by removing all panel options that would allow any change to the panel or the iconic network program.

13 Claims, 10 Drawing Sheets

METHOD FOR CREATING DYNAMIC USER PANELS IN AN ICONIC PROGRAMMING SYSTEM

This application is related to application Ser. No. 07/483,478 filed Feb. 22, 1990 for PROGRAMMING ESCAPE FROM AN ICONIC SYSTEM of Bailey, Beethe, Wolber, and Williams; application Ser. No. 07/537,550 filed Jun. 13, 1990 for PROCESSING METHOD FOR AN ICONIC PROGRAMMING SYSTEM of Beethe; application Ser. No. 07/661,936 filed Feb. 28, 1991 for LINE PROBE IN AN ICONIC PROGRAMMING SYSTEM of Wolber; application Ser. No. 07/668,286 filed Mar. 12, 1991 for INPUT AND OUTPUT CONSTRAINTS ON DEVICES IN AN ICONIC PROGRAMMING SYSTEM of Wolber and Beethe; and application Ser. No. 07/668,285 filed Mar. 12, 1991 for A SYSTEM FOR ENTERING AND MODIFYING VARIABLE NAMES FOR TERMINALS OF ICONS IN AN ICONIC PROGRAMMING SYSTEM of Wolber and Beethe, all assigned to the same entity.

FIELD OF THE INVENTION

This invention relates to computer systems and more particularly to Iconic Programming Systems. Even more particularly, the invention relates to dynamically creating user panels in such a system.

BACKGROUND OF THE INVENTION

An iconic programming system is a "programming-less" environment where programming is done by connecting graphical images of tools (icons), together with connecting lines, to form a directed graph and create an iconic network which represents a software program. The iconic programming system may be used in research and development test environments, where several different electronic instruments are connected to test a system or device. Programming such a system requires instructions to cause the various instruments to perform desired functions in order to operate as a system.

When an iconic programming system is used, each instrument will be represented by a graphical icon, also called a graphical object, and the connections between the instruments are represented by lines between these graphical images. In addition to graphical icons representing instruments in such a system, graphical icons are provided for programming functions, for example looping, IF-THEN statements, etc. By combining instrument and programming icons, a user can create an iconic network involving the programmed operation of several instruments.

An iconic network program can be large and/or complicated. Often the user of the program does not need to know the details of all icons within the program, but does need to see certain icons such as data input icons and data display icons. Also, some icons need only display when certain events occur. This provides a way of displaying information only when the information is needed.

Prior art iconic programming environments, such as the environment disclosed in U.S. Pat. Nos. 4,901,221 issued Feb. 13, 1990 to Kodosky, et al. and 4,914,568 issued Apr. 3, 1990 to Kodosky et al. do not allow a user to select elements for a user panel and includes all Input/Output elements on the panel. Also, the panels in this system do not allow non-input/output elements on a panel.

There is a need in the art then for a system that will provide a way for a programmer in an iconic system to define a user panel. There is further need for such a system to allow a panel to be defined to only be visible when an icon is processed. A still further need is to allow a user to select the elements that will be included in the panel. The present invention meets these needs.

Various features and components of an iconic network system are disclosed in U.S. patent applications:

(A) Application Ser. No. 07/483,478 filed Feb. 22, 1990 for PROGRAMMING ESCAPE FROM AN ICONIC SYSTEM of Bailey, Beethe, Wolber, and Williams;

(B) Application Ser. No. 07/537,550 filed Jun. 13, 1990 for PROCESSING METHOD FOR AN ICONIC PROGRAMMING SYSTEM of Beethe;

(C) Application Ser. No. 07/661,936 filed Feb. 28, 1991 for LINE PROBE IN AN ICONIC PROGRAMMING SYSTEM of Wolber;

(D) Application Ser. No. 07/668,286 filed Mar. 12, 1991 for INPUT AND OUTPUT CONSTRAINTS ON DEVICES IN AN ICONIC PROGRAMMING SYSTEM of Wolber and Beethe; and (E) Application Ser. No. 07/668,285 filed Mar. 12, 1991 for A SYSTEM FOR ENTERING AND MODIFYING VARIABLE NAMES FOR TERMINALS OF ICONS IN AN ICONIC PROGRAMMING SYSTEM of Wolber and Beethe.

each of which is hereby specifically incorporated by reference for all that is disclosed therein.

SUMMARY OF THE INVENTION

It is an aspect of the present invention to provide a system that allows an iconic programmer within an iconic programming system to dynamically create a user panel for an iconic network.

It is another aspect of the invention to provide such a system that will optionally display the user panel when an icon within the panel is processed.

A further aspect of the invention is to allow the panel to be secured to prevent further change to the panel or its network program.

The above and other aspects of the invention are accomplished in a system that allows a programmer or user of the system to dynamically create a user panel for an iconic network program. The user selects the icons from the network that are to be included on the panel and then selects an add to panel function to place the icons on a panel. The system displays the panel after adjusting the icon locations so that they fit within the panel. The programmer or user is then allowed to further move the icons to a desired location.

The programmer or user may select a show-on-execute option for any panels for user objects (subprograms). This will cause these panels to display automatically if one of the icons on the panel is processed by the iconic programming system. The programmer or user may also secure the panel by removing all panel options that would allow any change to the panel or its iconic network program.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
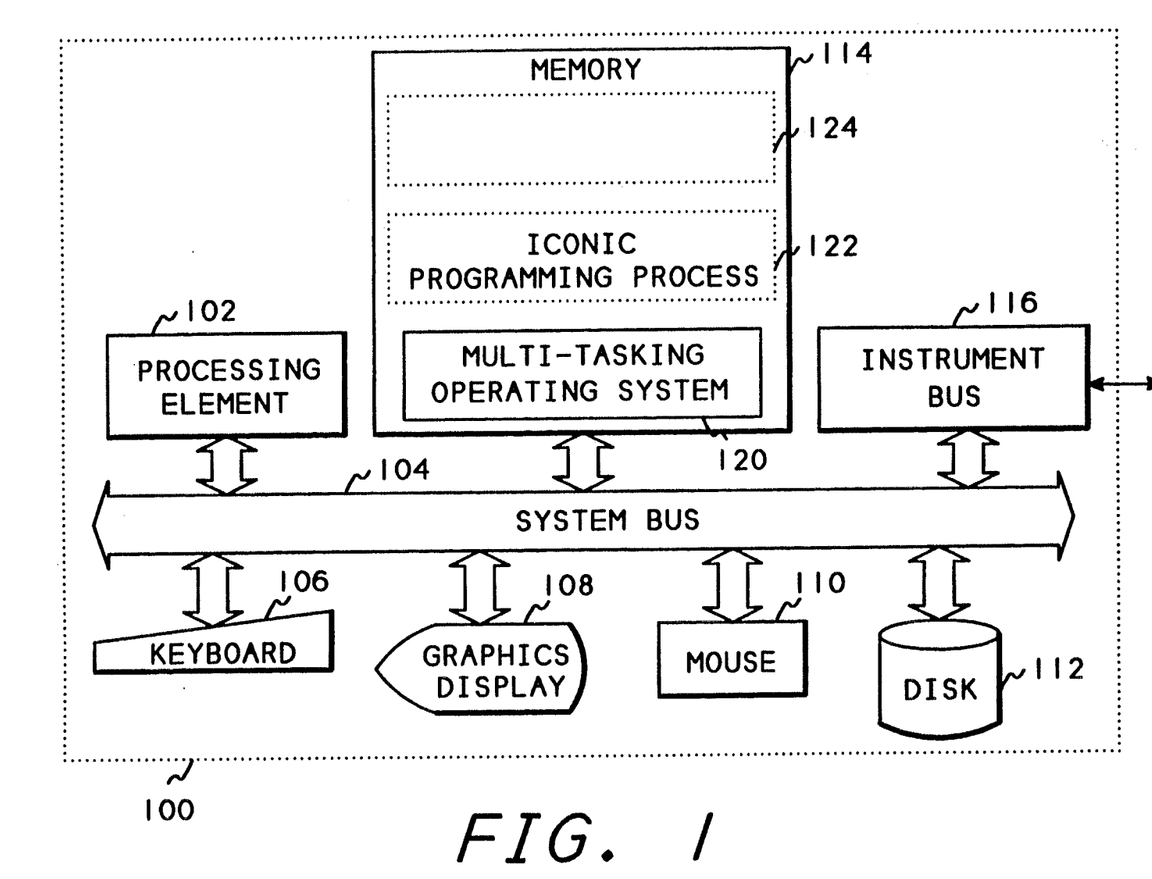
FIG. 1 shows a block diagram of a computer system incorporating the present invention.

FIG. 1 shows a block diagram of a computer system incorporating the present invention. Referring now to FIG. 1, a computer system 100 contains a processing element 102 which connects to the other components of the system through a system bus 104. A keyboard 106 allows a user to input textual data to the system, and a mouse 110 allows a user to input graphical data to the system. A graphics display 108 allows the system to output text and graphical information to the user. A disk 112 is used by the system to store the software of the iconic programming system environment, as well as the user-defined iconic network. An instrument bus 116, typically an IEEE 488 bus, is used to allow the iconic programming system to communicate with test instruments. Memory 114 is used to contain the software and user data of the iconic programming environment. A multi-tasking operating system 120 can have a plurality of tasks, also called processes, here illustrated by task 122 and task 124. Task 122 is shown containing the iconic programming process of the present invention.

Figure 2:
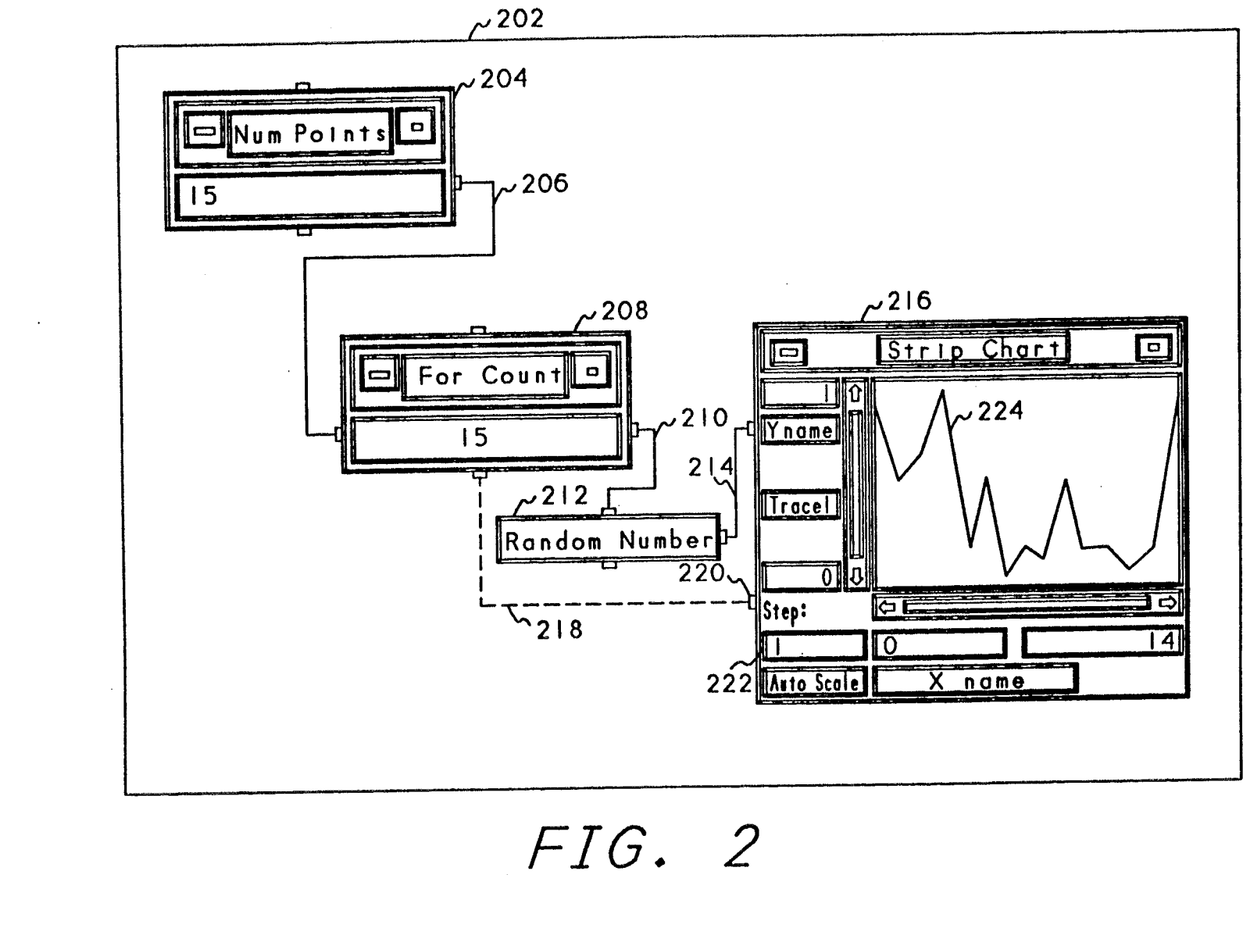
FIG. 2 shows an example iconic network.

FIG. 2 shows an example iconic network. Referring now to FIG. 2, a display screen 202 contains a numeric input icon 204 which is used to define a number of points, in this example 15, which will be displayed on a strip chart icon 216. The number of points is sent over a connecting line 206 to a count icon 208. The count icon 208 will count from zero to the number of points received on the connecting line 206. Each time the count icon 208 increments the count value by one, a signal will be sent over connecting line 210 to a random number icon 212. When the random number icon 212 receives the signal on connecting line 210, the random number icon 212 outputs a random number over a connecting line 214 which is input as the Y value to the strip chart 216.

After all 15 random numbers have been output by the random number icon 212, a sequence signal is sent from the count icon 208 over dashed connecting line 218 to autoscale input 220 of the strip chart 216. This signal will cause the strip chart to rescale and redisplay a waveform 224.

The iconic programmer who created the system illustrated in FIG. 2 needs to see the complete display of FIG. 2. However, to use the iconic network, a user of the iconic network of FIG. 2 would not need to see all the details that are shown in FIG. 2. A user would only need to see the number input icon 204 and the strip chart icon 216. The details involved in the count icon 208, the random number icon 212, and the connecting lines would not be necessary just to use the iconic network. In fact, showing these extra details can be quite confusing on a large iconic network. Therefore, the system of the present invention allows an iconic programmer to select certain icons to be displayed on a user panel, thus hiding unnecessary details for a user of the system.

Figure 3:
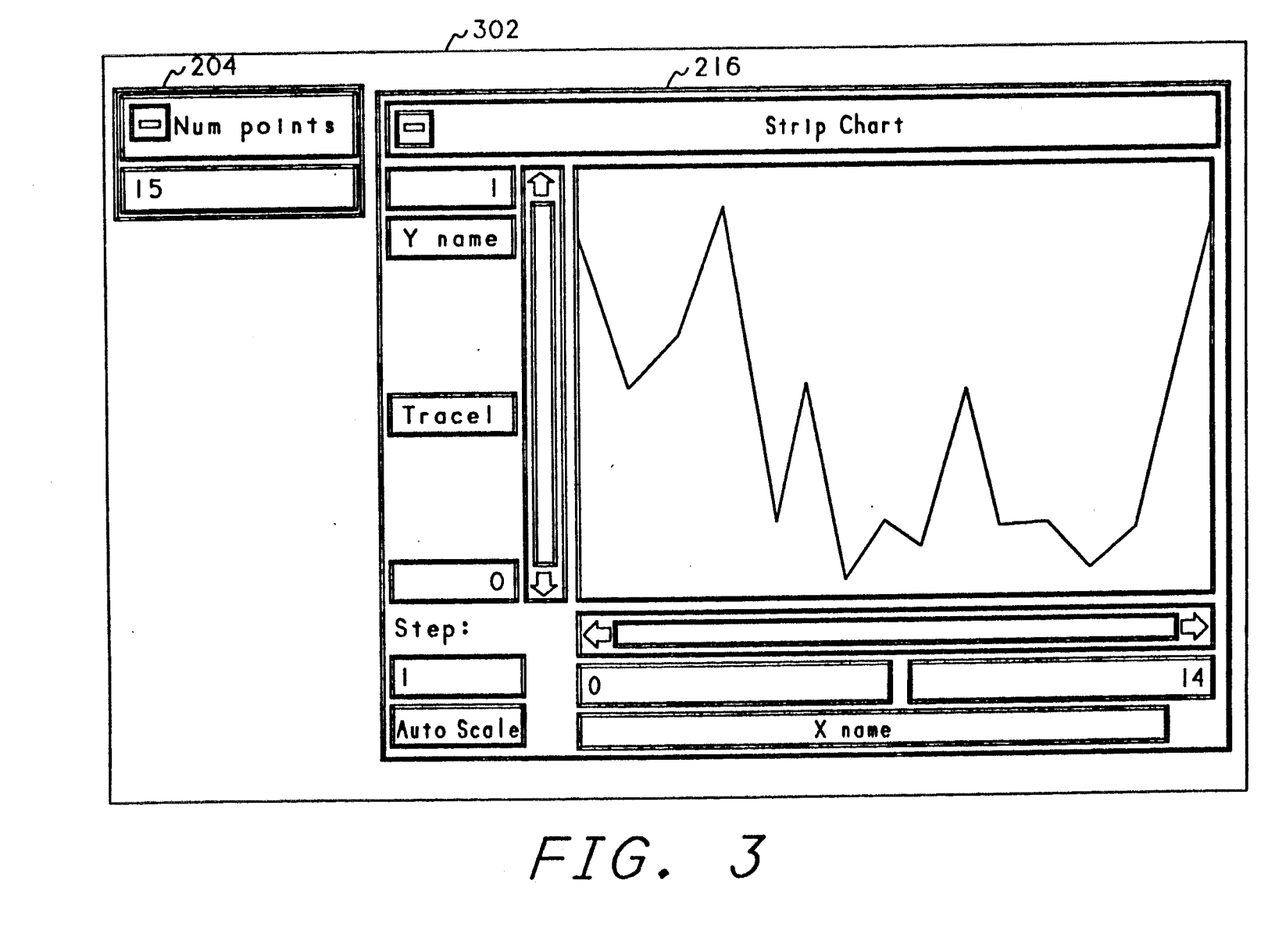
FIG. 3 shows a user panel created from the iconic network of FIG. 2.

FIG. 3 shows a user panel created from the iconic network of FIG. 2. As described above, a user of the iconic network of FIG. 2 would only need to see the number input icon 204 and the strip chart 216. Therefore, the user panel of FIG. 3 only shows these icons, and hides the other details which are unnecessary to a user of the network. Referring now to FIG. 3, a screen 302 shows the user panel created from the network of FIG. 2. The numeric input icon 204 is shown to the side the strip chart 216. Because of the additional space provided by eliminating unnecessary icons on the display, the strip chart 216 can be expanded in size to be more visible to the user of the system.

Figure 4:
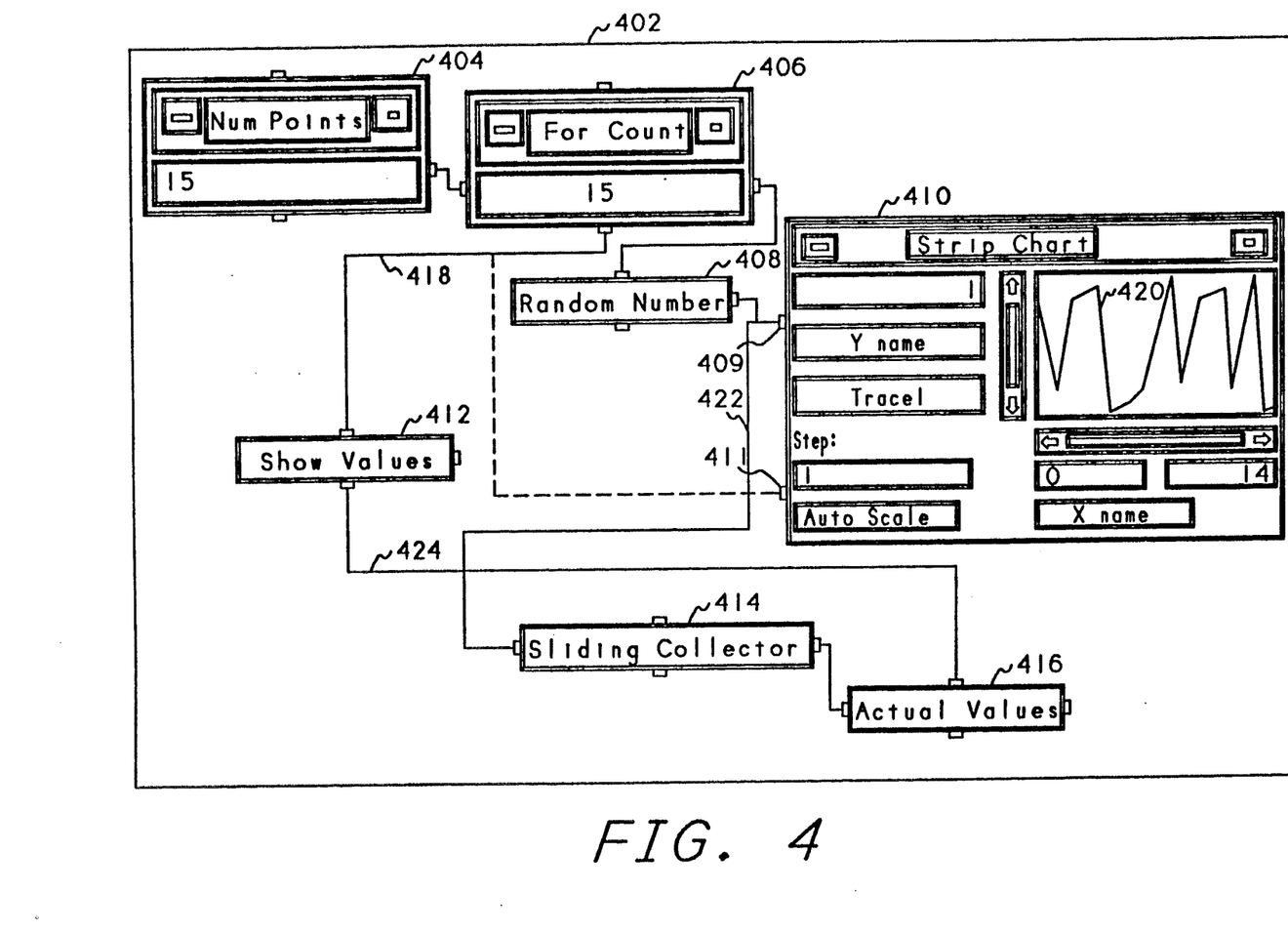
FIG. 4 shows a more complicated example iconic network.

FIG. 4 shows a more complicated example of an iconic network and will be used to illustrate user panels that contain elements that display only when the underlying icon is processed. Referring now to FIG. 4, a display screen 402 contains a numeric input icon 404, which has been used to input the value 15. The numeric icon 404 sends the value to a count icon 406 which will count from zero to the value input from the numeric input icon 404. Each time the count icon 406 increments its counter, it sends a signal to a random number icon 408 which outputs a random number to the Y input 409 of a strip chart 410. After 15 random numbers have been sent from the random number icon 408 to the Y input 409, the count icon 406 outputs a sequence signal over a connecting line 418 which is sent to an autoscale input 411 of the strip chart 410. These icons and connections will cause the strip chart 410 to display a random waveform 420 in the same manner as FIG. 2.

In the iconic network of FIG. 4, however, additional icons are used to accumulate the information in a different manner. The random number output by the random number icon 408 is sent to the input of a sliding collector 414 in parallel with being sent to the Y input 409 of the strip chart 410. The sliding collector 414 will collect each of the random numbers and store them in an array. This array will be sent to an actual values icon 416, which has been created as a user object. The sequence output of the count icon 406, which is sent to the step input 411 of the strip chart 410, is also sent in parallel to a show values icon 412. This icon will be used to trigger a user panel which will display the actual values sent to the strip chart 410. A sequence output of the show values icon 412 is sent over a connecting line 424 to a sequence input of the actual values icon 416.

Figure 5:
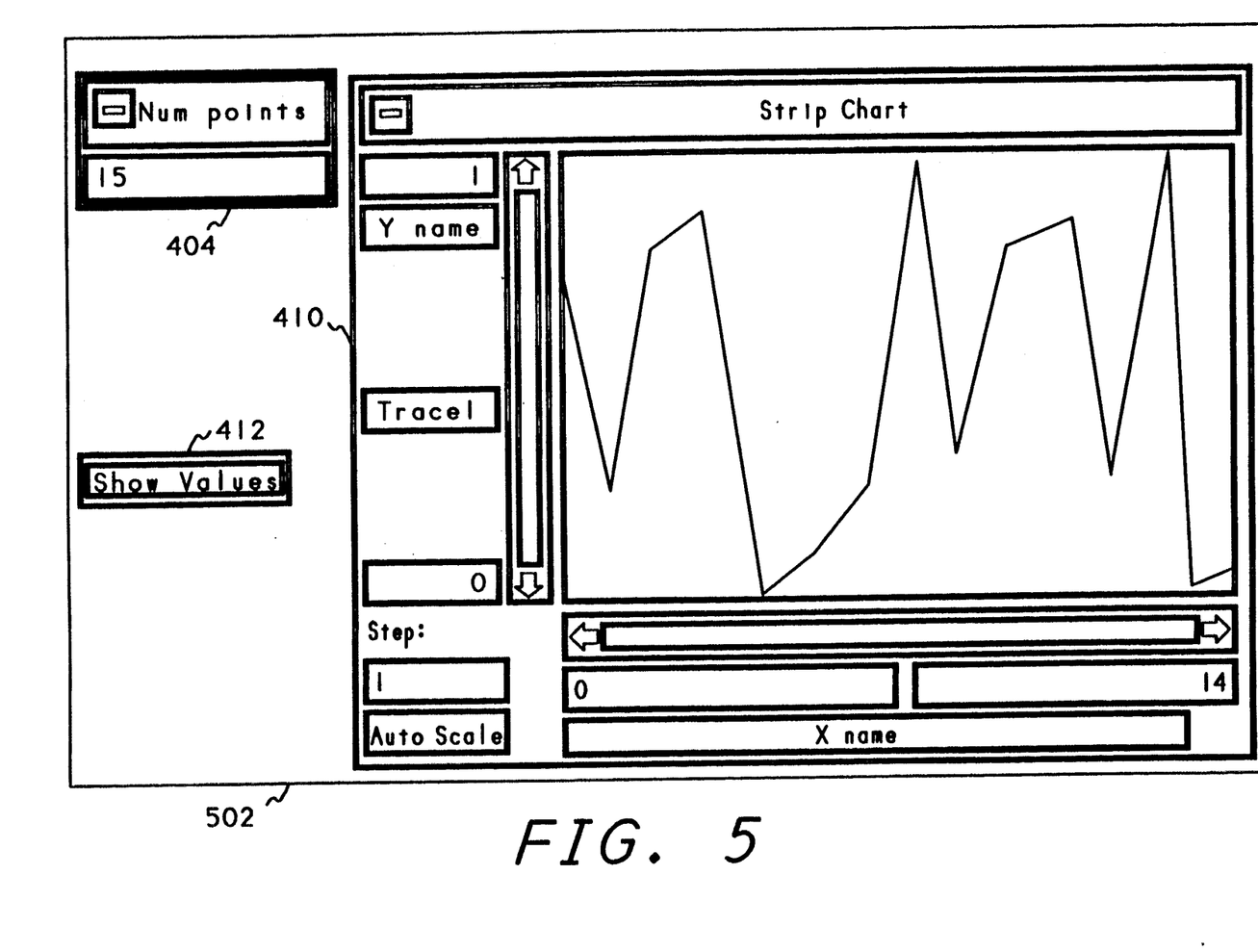
FIG. 5 shows a user panel created from the iconic network of FIG. 4.

FIG. 5 shows a user panel created from the iconic network of FIG. 4. Referring now to FIG. 5, a display screen 502 contains the numeric input icon 404, the strip icon 410, and the show values icon 412 from the iconic network of FIG. 4.

If a user of the system uses a graphics input device to click on the show values icon 412, the show values icon will output a signal over the connecting line 424 (FIG. 4) which will trigger the actual values icon 416. The actual values icon 416 has been configured as a show-on-execute user panel. Since the actual values icon 416 receives an array containing the random numbers output by the random number icon 408 and collected by the sliding collector 414, when it receives an input on its sequence input from the connecting line 424, a user panel pops up as illustrated in FIG. 6.

Figure 6:
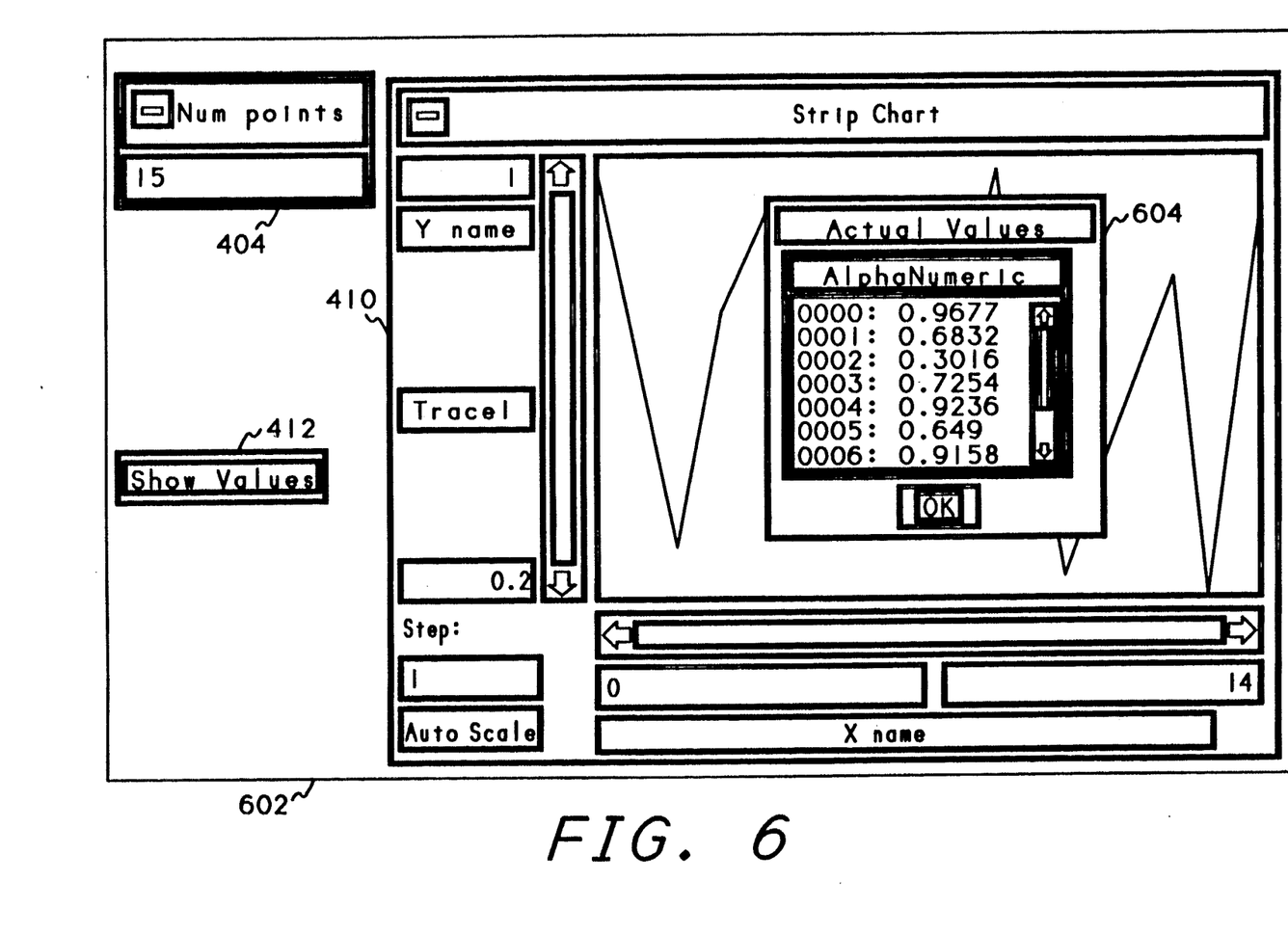
FIG. 6 shows an example of a user panel containing a show-on-execute user panel created from the network of FIG. 4.

FIG. 6 shows an example of a user panel containing a show-on-execute user panel created from the iconic network of FIG. 4. Referring now to FIG. 6, a display screen 602 contains the numeric input icon 404, the strip chart icon 410, and the show values icon 412. In the example of FIG. 6, the iconic network of FIG. 4 has processed, and the user has clicked on the show values icon 412. This causes the actual values user panel 604 to pop up on the display and show the actual random numbers which have been displayed on the strip chart 410. If the show-on-execute option had not been set for the actual values user panel 604, the icon would have processed without displaying the user panel. The show-on-execute option is only available for a user panel connected to a user object, and is not available for the main user panel connected to the entire network.

The following description of the flow charts of FIGS. 7-10 will illustrate the process of dynamically creating user panels and the show-on-execute function.

Figure 7:
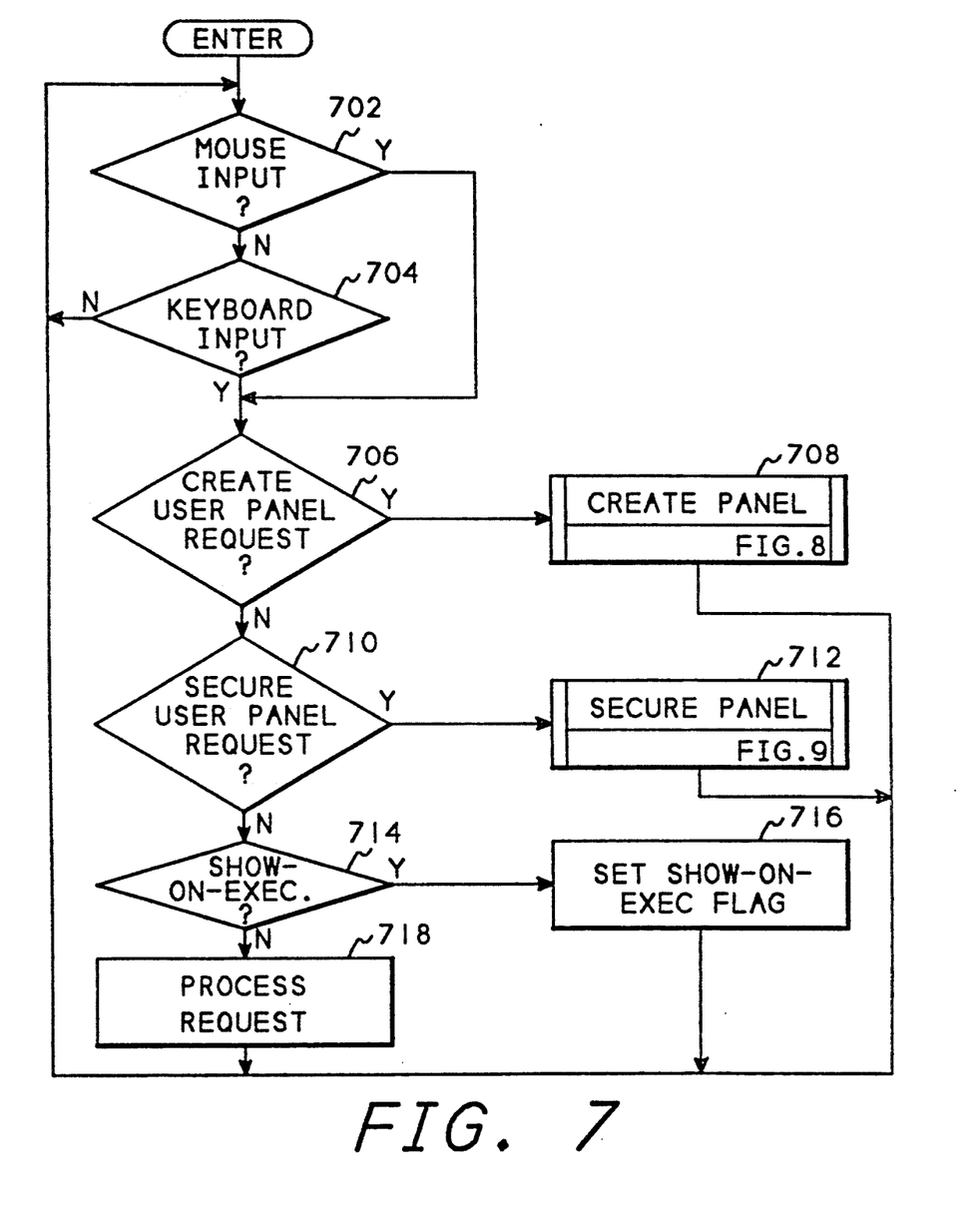
FIG. 7 shows a flowchart of the top level process used by the iconic programming system to interact with the user.

FIG. 7 shows a flow chart of the top level process used by the iconic programming system to interact with the user. Referring now to FIG. 7, after entry, block 702 determines whether the user has clicked the mouse graphic input device. If not, block 702 transfers to block 704 which determines whether there has been user input, and if not, block 704 returns to block 702. This loop continues until the user either clicks the mouse device on an icon, or types input at the keyboard. When either of these occurs, control transfers to block 706 which determines whether the user is requesting that the system create a user panel. A user panel may be created for the entire iconic network or for any user objects, also called subprograms, within the network. If the user is requesting a create user panel, block 706 transfers to block 708 which calls FIG. 8 to create, or add to, the panel. Block 708 then returns to block 702 to monitor input. If the user did not request the creation of a user panel, block 706 transfers to block 710 which determines whether the user requested that a user panel be secured. If the user requested the secure user panel function, block 710 transfers to block 712 which calls FIG. 9 to secure the panel. After return from FIG. 9, block 712 transfers back to block 702 to wait for user input. If the user did not request the secure user panel option, block 710 transfers to block 714 which determines whether the user requested setting the show-on-exec option for a user panel connected to a user object. If the user requested setting the show-on-exec option, block 714 transfers to block 716 which sets the show-on-exec flag for the user panel connected to a user object and transfers to block 702 to wait for user input. If the user did not request the show-on-exec function, block 714 transfers to block 718 which processes the user request before returning to block 702 to await additional user input. The many other functions that can be performed with the iconic programming system by block 718 are not described in this application, however, they are described in many of the applications referred to in the background of the invention.

Figure 8:
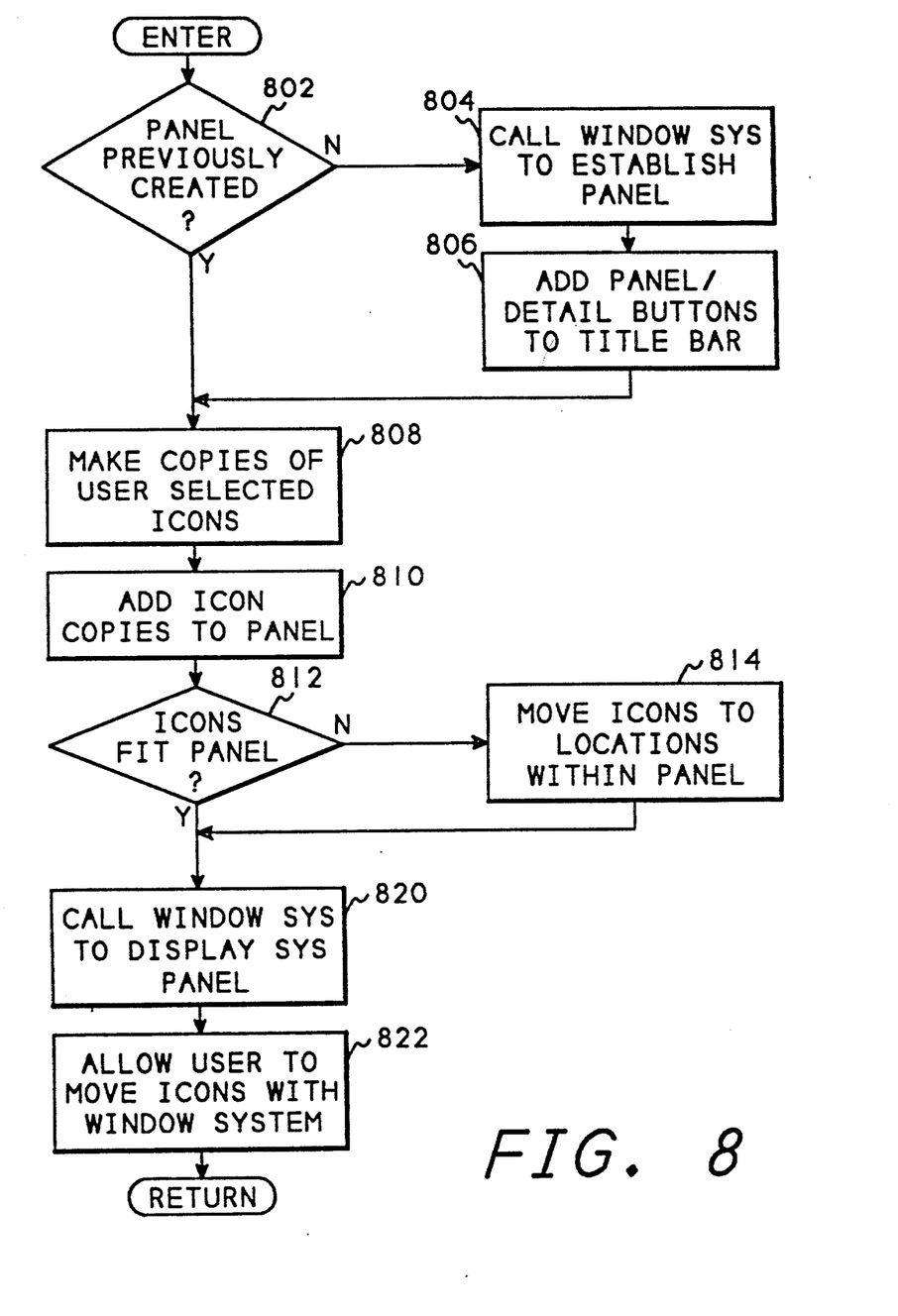
FIG. 8 shows a flowchart of the create user panel process.

FIG. 8 shows a flow chart of the create, or add to, user panel process. Referring now to FIG. 8, after entry, block 802 determines whether a user panel has been previously created. If a user panel has not been previously created, block 802 transfers to block 804 which calls the windowing system to establish a new user panel. The system of the present invention is implemented on a computer system that uses a windows programming environment. An example of such a windows programming environment is the X Window System of the Unix operating system, or the MicroSoft Windows System used on the MS DOS operating system. Unix is a trademark of A T & T, and MicroSoft Windows is a trademark of MicroSoft Corporation.

After establishing a new panel, block 804 transfers to block 806 which adds the panel and detail buttons to the title bar at the top of the panel. After adding the title bar details, or if the panel had been previously created, control transfers to block 804 which makes copies of all icons selected by the user. To select these icons, the user simply uses the graphical input device to highlight an icon. In this manner, the user, or the iconic programmer, can place any desired icons from the iconic network onto the user panel. After making copies of the user selected icons, block 808 transfers to block 810 which adds these icon copies to the panel created in block 804. Block 812 then determines whether the icons fit into the user panel, and if not, transfers control to block 814 which moves icons to locations within the panel. Control then transfers to block 820 which calls the windowing system to display the entire user panel and then block 822 allows the user to distribute the icons within the panel as they desire, using the facilities available through the windowing system. After the user has performed any moving of the icons within the panel, FIG. 8 returns to FIG. 7.

Figure 9:
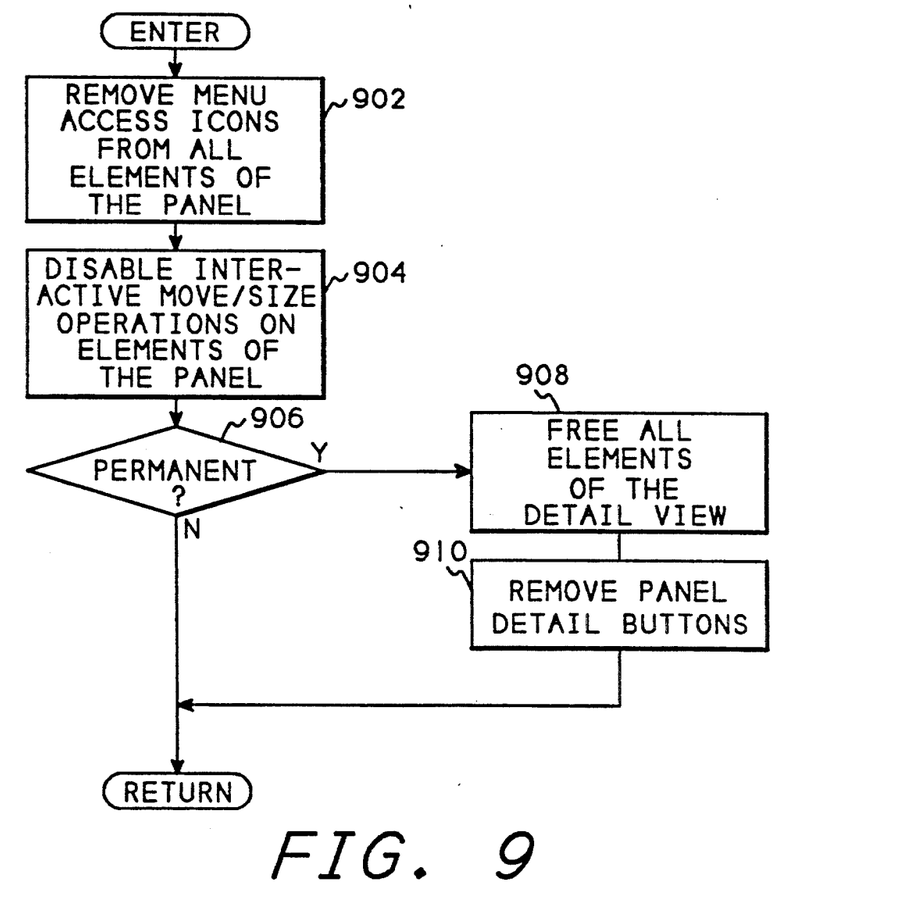
FIG. 9 shows a flowchart of the secure user panel process.

FIG. 9 shows a flow chart of the secure user panel process called from FIG. 7. This process is used to set up the panel so that it cannot be altered. Referring now to FIG. 9, after entry, block 902 removes all menu access icons from all elements of the panel. Block 904 then disables interactive move and size operations of elements within the panel. In combination, this prevents further alteration of the user panel. Block 906 then determines whether the secure is permanent, and if it is, block 906 transfers to block 908 which frees all the elements of the detailed view, and block 910 removes panel and detail buttons. These two steps prevents their being reincorporated into the panel at a later date. Control then returns to FIG. 7.

Figure 10:
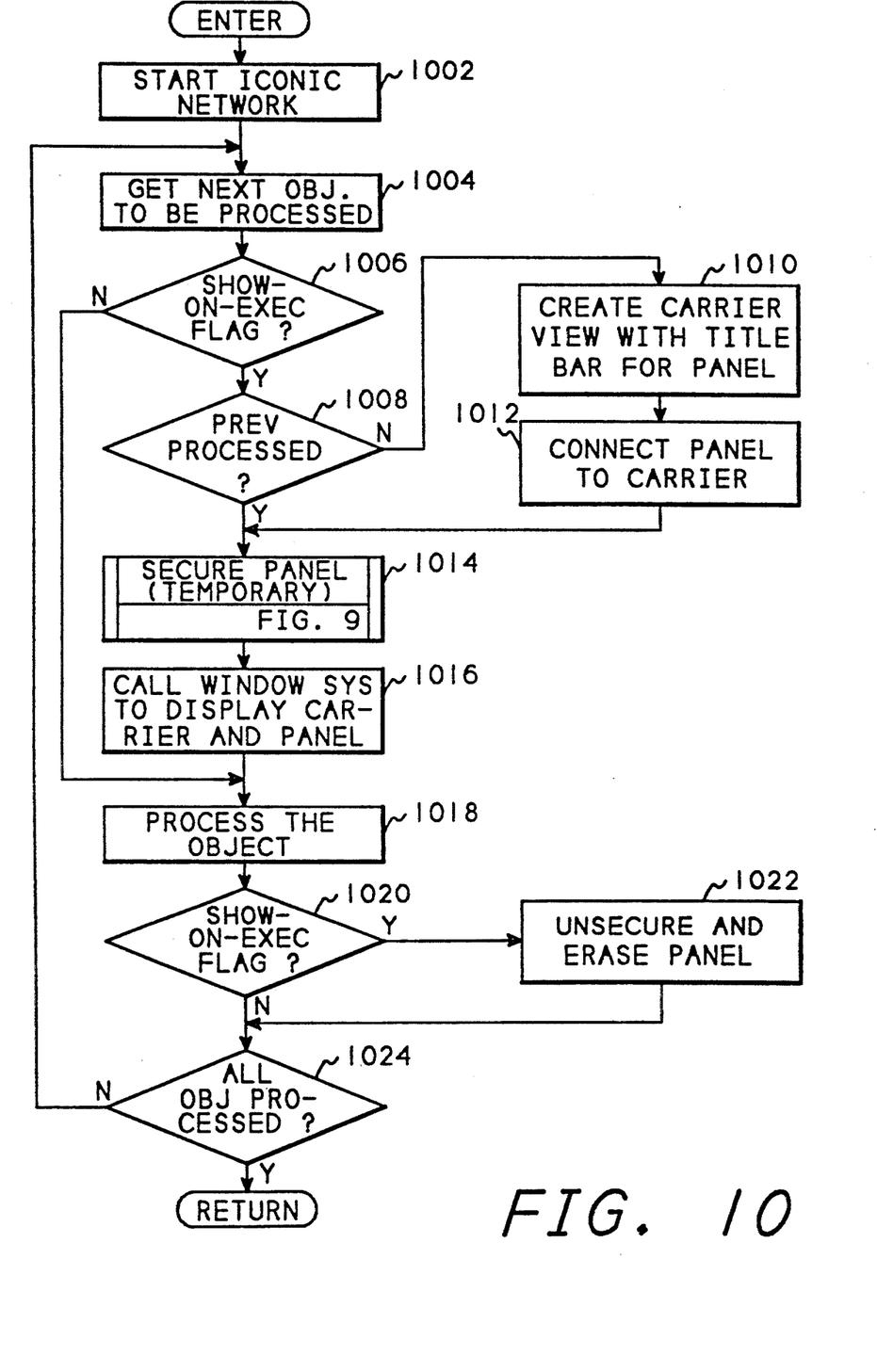
FIG. 10 shows a flowchart of the execution process and illustrates the show-on-execute process.

FIG. 10 shows a flow chart of the execution process and illustrates the show-on-execute process for user panels for user objects. Referring now to FIG. 10, after entry, block 1002 starts the processing of the iconic network. Block 1004 then gets the next object to get processed. Block 1006 determines whether the show-on-execute flag has been set for the object, and if it has, block 1006 transfers control to block 1008 which determines whether the object has been previously processed. If the object has not been previously processed, block 1008 transfers to block 1010 which creates a carrier for the panel. A carrier is the frame around the user panel which provides a title. Block 1012 then connects the panel to the carrier and transfers to block 1014. Block 1014 calls FIG. 9 to temporarily secure the panel so that it cannot be altered while it is being displayed. After securing the panel block 1016 calls the windowing system to display the carrier and the panel.

After displaying the panel, or if the show-on-execute flag was not set, control goes to block 1018 which processes the object. Block 1020 determines whether the show-on-execute flag was set. If this flag was set, block 1020 transfers to block 1022 which unsecures and erases the panel. Control then goes to block 1024 which determines whether all objects have been processed and if not, control returns to block 1004 to get the next object. After all objects have been processed FIG. 10 returns to its caller.

The system also allows a panel for a user object to be permanently connected to a higher level panel. This allows a higher level panel to be built from the lower level panels.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. In an iconic programming system process executing in an operating environment, wherein said iconic programming system process contains an existing network of connected icons, a computer implemented method for dynamically creating a user panel, said computer implemented method comprising the steps of:
   (a) accepting input from a user of said iconic programming system process to request creation for a user panel, wherein said user panel contains a subset of icons from said network of connected icons;
   (b) if said user panel has been previously created, continuing with step (d);
   (c) selecting an area of a graphics display device connected to said iconic programming system process for use as said user panel;
   (d) accepting user input to arbitrarily select at least one icon from said existing network of connected icons;
   (e) placing copies of said at least one icon selected in step (d) on said user panel, while retaining any connections between said at least one icon and other icons within said existing network of connected icons; and
   (f) displaying said user panel in said area.

2. The process of claim 1 wherein step (e) further comprises the step of:
   (e1) if said at least one icon is not completely visible within boundaries of said user panel, programmatically moving said at least one icon until said at least one icon is completely visible within said boundaries of said user panel.

3. The process of claim 1 wherein step (e) further comprises the step of:
   (e1) allowing a user of said iconic programming system to move said at least one icon within boundaries of said user panel.

4. The process of claim 1 wherein step (e) further comprises the step of:
   (e1) allowing a user of said iconic programming system to adjust a size of said at least one icon within boundaries of said user panel.

5. The process of claim 1 further comprising the steps of:
   (g) if said user panel is connected to a user object, accepting user input to set a show-on-execut flag for said user panel; and
   (h) when processing said iconic network, displaying said user panel only if said show-on-exec flag is set and an icon within said user object is processed by performing data processing functions represented by said icon.

6. The process of claim 1 further comprising the steps of:
   (g) if a user select an option to secure a user panel, removing all means from said user panel that would allow said user panel or said existing network of connected icons to be modified.

7. The process of claim 1 further comprising the step of:
   (g) if said user panel is connected to a user object, accepting user input to programmatically connect said user panel to a panel containing said user object.

8. In an iconic programming system process executing in an operating environment, wherein said iconic programming system process contains an existing network of connected icons, a computer implemented method for dynamically creating a user panel, said computer implemented method comprising the steps of:
   (a) accepting input from a user of said iconic programming system process to request creation of a user panel, wherein said user panel contains a subset of icons from said network of connected icons;
   (b) if said user panel has been previously created, continuing with step (d);
   (c) selecting an area of a graphics display device connected to said iconic programming system process for use as said user panel;
   (d) accepting user input to arbitrarily select at least one icon from said existing network of connected icons;
   (e) placing copies of said at least one icon selected in step (d) on said user panel, while retaining any connections between said at least one icon and other icons within said existing network of connected icons;
   (f) if said user panel is connected to a user object, accepting user input to set a show-on-execute flag for said user panel; and
   (g) when processing said iconic network, displaying said user panel only if said show-on-execute flag is set and an icon within said object is processed.

9. The process of claim 8 wherein step (e) further comprises the step of:
   (e1) if said at least icon is not completely visible within boundaries of said user panel, moving said at least one icon until said at least one icon is completely visible within said boundaries of said user panel.

10. The process of claim 8 wherein step (e) further comprises the step of:

(e1) allowing a user of said iconic programming system to programmatically move said at least one icon within boundaries of said user panel.

11. The process of claim 8 wherein step (e) further comprises the step of:

(e1) allowing a user of said iconic programming system to resize said at least one icon within boundaries of said user panel.

12. The process of claim 8 further comprising the steps of:

(g) if a user select an option to secure a user panel, removing all means from said user panel that would allow said user panel or said existing network of connected icons to be modified.

13. The process of claim 8 wherein step (f) further comprises the step of:

(f1) if said user panel is connected to a user object, accepting user input to programmatically connect said user panel to a panel containing said user object.

* * * * *